No. 690,706. Patented Jan. 7, 1902.
C. G. DINSMORE.
PNEUMATIC TIRE PROTECTOR.
(Application filed Apr. 18, 1901.)
(No Model.)
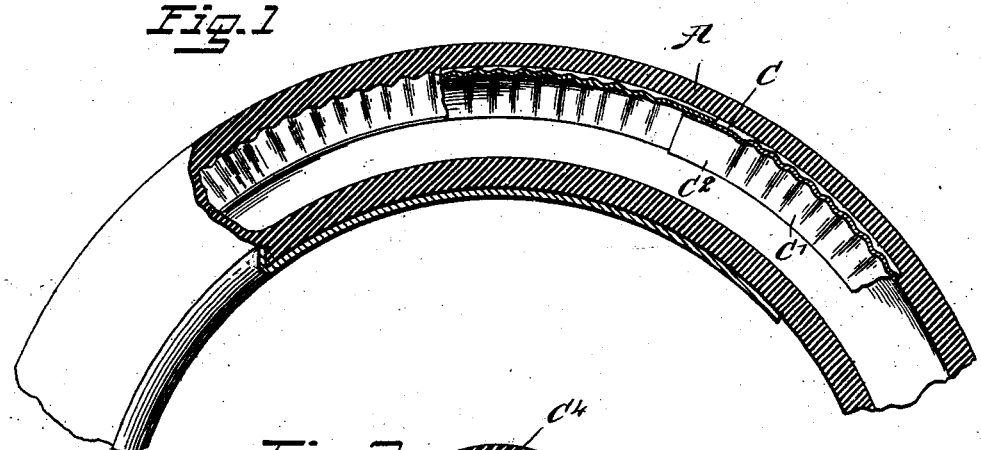
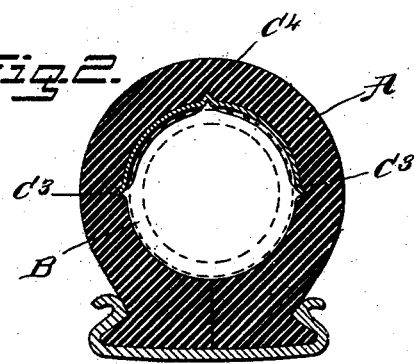
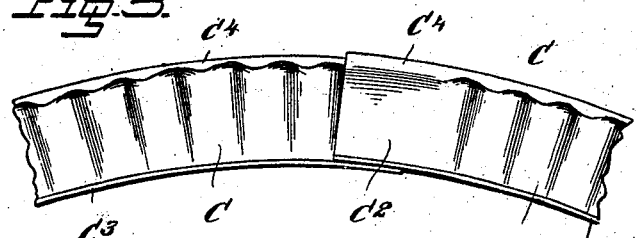
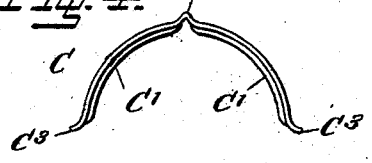
WITNESSES:
INVENTOR
Clarence G. Dinsmore
BY
ATTORNEYS

UNITED STATES PATENT OFFICE.

CLARENCE GRAY DINSMORE, OF STAATSBURG, NEW YORK.

PNEUMATIC-TIRE PROTECTOR.

SPECIFICATION forming part of Letters Patent No. 690,706, dated January 7, 1902.

Application filed April 18, 1901. Serial No. 56,389. (No model.)

*To all whom it may concern:*

Be it known that I, CLARENCE GRAY DINSMORE, a citizen of the United States, and a resident of Staatsburg, in the county of Dutchess and State of New York, have invented a new and Improved Pneumatic-Tire Protector, of which the following is a full, clear, and exact description.

The object of the invention is to provide a new and improved protector for the inner tube of a double pneumatic tire to prevent the inner tube from being punctured, the protector being designed for use in double-tube tires employed on the wheels of automobiles, bicycles, and other vehicles.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a sectional side elevation of the improvement as applied. Fig. 2 is an enlarged transverse section of the same. Fig. 3 is a side elevation of the improvement. Fig. 4 is an end view of the same, and Fig. 5 is a like view of a modified form of the improvement.

The pneumatic tire consists, essentially, of an outer tube A, an inner tube B, and a protector or shield C, interposed between said tubes A and B, the protector or shield C having a cross-section corresponding approximately to the outer peripheral half portion of the inner tube B and a corresponding portion of the inner surface of the outer tube A, as will be readily understood by reference to Fig. 2. The shield C is made of sheet metal and preferably formed in one continuous piece having transverse corrugations $C'$ to give the desired rigidity to the protector or shield when applied to the inner surface of the outer tube A, as shown in the drawings. The ends $C^2$ of the shield are plain—that is, not corrugated—and the ends overlap to permit the shield to yield in the direction of its length without exposing the inner tube upon compressing the outer tube A when a load is applied.

The protector or shield C has its side edges formed into outwardly-extending flanges $C^3$ to embed themselves in the material of the outer tube A at or near the middle portions thereof, as is plainly indicated in Fig. 2, so as to securely hold the protector or shield in position on said outer tube. An outwardly-extending flange $C^4$ is also preferably formed along the middle of the protector or shield to engage the material of the outer tube A at the inner portion thereof, and thereby assist the flanges $C^3$ in preventing lateral movement of the protector or shield in the outer tube A. The flange $C^4$ may be omitted, as shown in Fig. 5. Instead of making the protector in one single piece it may be made in sections having adjacent ends overlapping.

By the arrangement described the shield C forms a protection for the inner inflated tube B, so that in case a nail or other article cuts into and punctures the outer tube A then the shield C prevents said nail or other article from puncturing the inner tube, and consequently the tire does not become deflated. The outer tube A is open along the inner portion, so as to permit of conveniently inserting the protector or shield C and the inner tube B.

The corrugations $C'$ in addition to giving rigidity to the shield C also prevent longitudinal or creeping movement of the tire, so that no other fastening means are necessary for holding the protector or shield in place.

Having thus fully described my invention, I claim as new and desire to secure by Letters Patent—

1. A double-tube pneumatic tire having a shield interposed between the outer and inner tube, the ends of the shield overlapping and being free to permit the shield to yield in the direction of its length, the said shield being formed with outwardly-extending flanges arranged to embed themselves in the material of the outer tube to hold the shield in place, as set forth.

2. A double-tube pneumatic tire having a shield interposed between the inner tube and the outer tube, the shield being made in one continuous piece arched transversely and having transverse corrugations, the ends of the shield being free from corrugations and overlapping, the side edges of the shield having outwardly-extending flanges adapted to embed themselves in the material of the outer tube, the said shield being also formed with an outwardly-extending V-shaped flange along the middle of the shield to engage the material of the outer tube, as set forth.

In testimony whereof I have signed my name to this specification in the presence of two subscribing witnesses.

CLARENCE GRAY DINSMORE.

Witnesses:
F. W. HANAFORD,
EVERARD B. MARSHALL.